United States Patent [19]

Durairaj

[11] Patent Number: 5,030,692
[45] Date of Patent: Jul. 9, 1991

[54] RUBBER COMPOUNDING RESORCINOLIC RESINS AND PROCESS FOR MAKING THE SAME

[75] Inventor: Bojayan Durairaj, Pittsburgh, Pa.

[73] Assignee: Indspec Chemical Corporation, Pittsburgh, Pa.

[21] Appl. No.: 452,979

[22] Filed: Dec. 19, 1989

Related U.S. Application Data

[63] Continuation-in-part of Ser. No. 230,605, Aug. 10, 1988.

[51] Int. Cl.$^5$ .............................................. C08L 61/06
[52] U.S. Cl. .................................... 525/134; 525/135; 525/139; 525/140
[58] Field of Search ................. 525/135, 134, 139, 140

[56] References Cited

U.S. PATENT DOCUMENTS

| | | | |
|---|---|---|---|
| 4,150,194 | 4/1979 | Watts et al. | 428/531 |
| 4,167,540 | 9/1979 | Giller et al. | 525/135 |
| 4,257,926 | 3/1981 | Tanimura et al. | 260/3 |
| 4,310,653 | 1/1982 | Krajewkie et al. | 524/841 |
| 4,317,896 | 3/1982 | Holik | 523/145 |

FOREIGN PATENT DOCUMENTS 1564235 4/1980 United Kingdom .

Primary Examiner—Lewis T. Jacobs
Attorney, Agent, or Firm—Arnold B. Silverman; Craig G. Cochenour; Michael J. Kline

[57] ABSTRACT

Low fuming and less hygroscopic rubber compounding cashew nut shell liquid, allylphenol and alkylphenol modified resorcinolic novolak resins are made by condensing (A) a resol prepared by first reacting at least one monovalent phenol having the general formula (a)

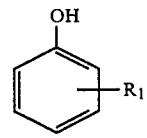

wherein $R_1$ may be selected from the group consisting of hydrogen, an allyl, an alkyl of 1 to about 20 carbon atoms and an aryl having about 6 to about 12 carbon atoms, with methylformcel and/or furfural in the presence of an alkaline catalyst, or optionally reacting at least one monovalent phenol of the above-mentioned general formula (a) and cashew nut shell liquid, with methylformcel and/or furfural in the presence of an alkaline catalyst; and then (B) reacting the product of Step (A) with at least one of the compounds having the general formula (b)

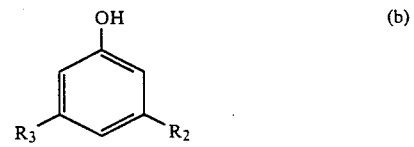

wherein $R_2$ and $R_3$ may be the same or different radicals selected from the group consisting of —H, —OH, —NH$_2$, an allyl and an alkyl having 1 to about 20 carbon atoms.

15 Claims, No Drawings

RUBBER COMPOUNDING RESORCINOLIC RESINS AND PROCESS FOR MAKING THE SAME

CROSS REFERENCE TO RELATED APPLICATIONS

This is a continuation-in-part of co-pending U.S. patent application Ser. No. 07/230,605, filed Aug. 10, 1988.

BACKGROUND OF THE INVENTION

1. Field of the Invention

The present invention relates to low fuming, less hygroscopic resorcinolic novolak resins which are used with curing agents in rubber to give improved mechanical properties and tire cord to rubber adhesion.

2. Brief Description of the Prior Art

Resorcinol and resorcinol-formaldehyde resins have been used in the rubber industry as rubber compounds and adhesives. These resorcinolic compounds and resins are unique materials for rubber compounding since they act as thermosetting or vulcanizing plasticizers. They are very efficient plasticizers for rubber during the processing operations. This allows easier processing, higher loading and excellent extrusions for the rubber compounds.

The thermosetting properties of the resorcinol and resorcinol based resins on curing allow the cured rubber materials to show increase in hardness, abrasion resistance, aging resistance, solvent and oil resistance and stiffness, and also give much improved finishes to the cured rubber stock. This combination of plasticizing and reinforcing action is rare for a single material. In addition, these resorcinolic resins may act as antioxidants when used in the natural rubber.

Although resorcinol-formaldehyde based resins provide good mechanical and adhesion properties, the high fuming and hygroscopicity of these resins present problems in rubber compounding and handling. To solve this problem, tire manufacturers are seeking modified resorcinolic derivatives and resins that do not produce volatiles such as resorcinol at Banbury temperatures. The hygroscopic behavior of resorcinol-formaldehyde resins can be reduced by introducing a hydrophobic aliphatic hydrocarbon chain in the resin molecule. This can be achieved by making use of an alkyl substituted phenol, resorcinol or an aldehyde with a long aliphatic chain in the resin preparation. In the case of an alkyl substituted phenol, this can be reacted with an aldehyde alone or in combination with resorcinol to develop resins using acidic or basic catalysts. In addition to low volatility and hygroscopicity, the new resorcinolic resins should Lave reactivity similar to resorcinol and be non-blooming in the rubber compound.

When the alkylphenols are used with resorcinol, they should be reacted first with aldehydes before adding resorcinol into the reaction mixture because of higher reactivity of the resorcinol as compared to alkylphenols. This procedure will help in reducing the amount of unreacted alkylphenols in the resulting resin.

The prior art on such resin development is well described in U.S. Pat. No. 4,167,540. This patent discloses that nonylphenol modified resorcinolic resin is made by reacting first nonylphenol and paraformaldehyde (91% active) using toluene sulfonic acid as the catalyst and then resorcinol is added to produce a novalak type resin.

U.S. Pat. No. 4,257,926 describes the parasubstituted phenol modified resorcinol-formaldehyde resins using alkaline catalysts. This patent discloses that the resoles are produced first by reacting p-alkylphenols with paraformaldehyde or acetaldehyde using sodium hydroxide as the catalyst. Then the formed resoles, without isolation, are allowed to condense with resorcinol to produce the novolak type resins. In these resin preparations, 88% paraformaldehyde is used and toluene is used as the azeotroping solvent.

United Kingdom Patent 1,564,235. discloses a heat reactive water-based adhesive composition comprising a water soluble, or water dispersible novolak phenolic resin, a methylene donor and water.

U.S. Pat. No. 4,257,926 discloses a method of preparing a co-polycondensate resin by condensing (A) a resol type pre-polycondensate prepared by at least one phenol and formaldehyde or acetaldehyde in the presence of an alkaline catalyst, and (B) resorcinol, m-aminophenol or the like while distilling off water present in the reaction system, and then solidifying the reaction mixture.

In spite of these prior art disclosures, there remains a very real and substantial need for an effective resorcinolic novolak resin which will provide a wide variety of desirable properties and that may be used with curing agents to give improved mechanical properties to rubber and improved tire cord to rubber adhesion.

It is, therefore, an object of the present invention to provide a resorcinolic novolak resin, containing furfural, cashew nut shell liquid (CARDOLITE NC-511) or an allylphenol, that is low fuming, less hygroscopic compared to resorcinol formaldehyde resin and capable of cross-linking with curing agents in the rubber to give improved mechanical properties and improved tire cord to rubber adhesion properties.

SUMMARY OF THE INVENTION

According to the present invention it has been discovered that a resorcinolic novolak type resin may be prepared by condensing (A) a resol prepared by reacting at least one monovalent phenol of the general formula (a)

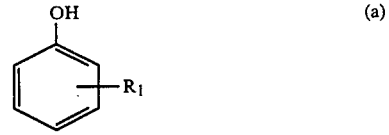

wherein $R_1$ may be selected from the group consisting of hydrogen, an allyl, an alkyl of 1 to about 20 carbon atoms and an a having about 6 to about 12 carbon atoms with methyl FORMCEL and/or furfural in the presence of an alkaline catalyst; and then (B) reacting the product of step (A) with at least one of the compounds of the general formula (b)

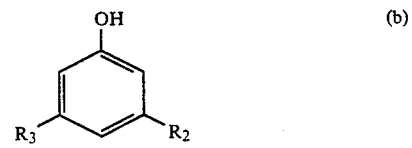

wherein $R_2$ an $R_3$ may be the same or different radicals selected from the group consisting of —H, —OH, —NH$_2$, an allyl and an alkyl having 1 to about 20 carbon atoms.

Additionally, it has been discovered that a resorcinolic novolak type resin may be prepared by condensing (A) a resol prepared by reacting at least one monovalent phenol of the general formula (a)

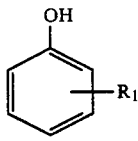

wherein $R_1$ may be selected from the group consisting of hydrogen, an allyl, an alkyl of 1 to about 20 carbon atoms and an aryl having about 6 to about 12 carbon atoms, and cashew nut shell liquid having both meta-substituted alkylphenol (90%) wherein the alkyl group consists of 15 carbon atoms with at least tow carbon-carbon double bonds in the chain and metal substituted alkyl resorcinol (10%) wherein the alkyl group consists of 15 carbon atoms with at least two carbon-carbon double bonds in the chain, with methyl FORMCEL and/or furfural in the presence of an alkaline catalyst; and then (B) reacting the product of Step (A) with at least one of the compounds of the general formula (b)

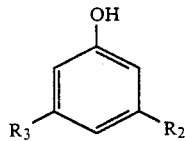

wherein $R_2$ and $R_3$ may be the same or different radicals selected from the group consisting of —H, —OH, —NH$_2$, an allyl and an alkyl having 1 to about 20 carbon atoms.

The present invention has met the above-described need by providing resorcinolic novolak type resins that are low fuming and less hygroscopic and that impart greater tensile and mechanical properties to the cured rubber compounds over the prior art.

A preferred embodiment of the process of this invention is to react allylphenol with methyl FORMCEL and/or furfural at a molar ratio of one mole of allylphenol to 1 to 2.1 moles of methyl FORMCEL and/or furfural in the presence of an alkaline catalyst at 60°–100° C. Thereafter, about 100 grams of methanol may be added followed by the slow addition of resorcinol at a molar ratio 0.8 to 2.5 moles and reacted at 60°–100° C., after which the solvent is removed under reduced pressure.

Another preferred embodiment of the process of this invention is to react alkylphenol with methyl FORMCEL and/or furfural at a molar ratio of 1 mole alkylphenol to 1.0 to 2.1 moles of methyl FORMCEL and/or furfural in the presence of an alkaline catalyst at 60°–100° C. Thereafter about 100 grams of methanol may be added followed by the slow addition of resorcinol at a molar ratio of 0.8 to 2.5 moles and reacted at 60°–100° C., after which the reaction product is dehydrated.

Further, a preferred embodiment of this invention is to react nonylphenol, cashew nut shell liquid and methyl FORMCEL at a molar ratio of 0.6 to 0.9 moles of nonylphenol, 0.4 to 0.1 moles of cashewnut shell liquid to 1 to 2.1 moles of methyl FORMCEL in the presence of an alkaline catalyst at 60°–100° C. Thereafter about 100 grams of methanol may be added followed by the slow addition of resorcinol at a molar ratio of 0.8 to 2.5 moles and refluxed, after which the solvent is removed under reduced pressure.

It is an object of this invention to provide resorcinolic novolak type resins which are capable of cross linking with curing agents in the rubber to give good mechanical properties to the cured rubber.

It is another object of the present invention to provide such a composition which may be employed using conventional apparatus.

It is a further object of the present invention to provide resorcinolic novolak type resins which are capable of cross linking with curing agents in the rubber to give good tire cord to rubber adhesion.

It is a further object of the present invention to provide resorcinolic novolak type resins that are low fuming and less hygroscopic.

These and other objects of the invention will be more fully understood from the following description of the invention.

DESCRIPTION OF THE PREFERRED EMBODIMENTS

Achievement of the objects in accordance with this invention, as embodied and broadly described, is related to an improved vulcanizable rubber composition comprising rubber, a filler material, methylene donor and an allylphenol or alkylphenol modified resorcinolic novolak type resin of this invention.

The following detailed descriptions are exemplary and explanatory and it is to be understood that their scope is not limited to the embodiments and restrictions of the invention.

The allylphenol and alkylphenol modified resorcinolic novolak resins used according to the present invention are advantageously prepared by condensing (A) a resol prepared by reacting at least one monovalent phenol having the general formula (a)

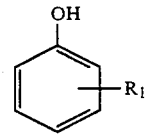

wherein $R_1$ may be selected from the group consisting of hydrogen, an allyl, an alkyl of 'to 20 about carbon atoms and an aryl having about 6 to about 12 carbon atoms, with methyl FORMCEL and/or furfural in the presence of an alkaline catalyst; and then (B) reacting the product of Step (A) with at least one of the compounds having the general formula (b)

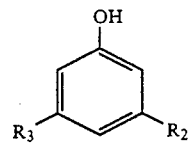

wherein $R_2$ and $R_3$ may be the same or different radicals selected from the group consisting of —H, —OH, —NH$_2$, an allyl and an alkyl having 1 to about 20 carbon atoms.

The monovalent phenols that may be used as components are ortho-, meta- or para-substituted. Suitable alkyl groups included are, for example, methyl, ethyl, propyl, isopropyl, sec. butyl, n-butyl, tert. butyl, isobutyl, n-hexyl, octyl, iso-octyl, nonyl, iso-nonyl, dodecyl and isododecyl as well as higher alkyl groups. Besides methyl FORMCEL and furfural, butylformcel can also be employed. The reaction of monovalent phenols and methyl FORMCEL and/or furfural can be carried out in the presence or absence of any additional solvents, but it is preferable to use an appropriate organic solvent in order to, ensure the smooth progress of the reaction. The function of such solvents used in this condensation reaction is to give better solubility for the allylphenol or alkylphenol, sodium salt of allylphenol or alkylphenol, resol and resin. Examples of such solvents are methyl alcohol, ethyl alcohol, n-propyl alcohol, isopropyl alcohol, acetone, tetrahydrofuran or the like.

The resol of the monovalent phenols can be prepared by reacting an allylphenol or alkylphenol with methyl FORMCEL and/or furfural at a molar ratio of one mole of allylphenol or alkylphenol to 1 to 2.1 moles of methyl FORMCEL and/or furfural, in the presence of an alkaline catalyst such as hydroxide or carbonate of an alkali metal or alkaline earth metals at a temperature in the range from 50° to 150° C. A suitable solvent may be added such as methanol.

As to the resol prepared from alkylphenol, the compound of the formula (b) is then added at a molar ratio of 0.8 to 2.5 moles and continue the reaction at a temperature ranged from 5020 to 150° C., after which the reaction product is dehydrated. Suitable compounds of the formula (b) include m-cresol, 3,5-dimethylphenol, resorcinol, m-aminophenol and cashew nut shell liquid (Cardolite NC-511 Resin). The alkylphenol modified resorcinolic resins are generally brown brittle resins. They generally have softening points in the range from 40° to 150° C.

As to the resol prepared from allylphenol, the compound of the formula (b) is then slowly added at a molar ratio of 0.8 to 2.5 moles at about room temperature to about 60° C., after which the reaction mixture is refluxed and the solvent removed under reduced pressure. Suitable compounds of the formula (b) include m-cresol, 3,5-dimethylphenol, resorcinol, m-aminophenol and cashew nut shell liquid (Cardolite NC-511 Resin). The allylphenol modified resorcinolic resins are generally brown brittle resins. They generally have softening points in the range from 40°-150° C.

According to this invention the allylphenol and alkylphenol modified resorcinolic resins are preferably incorporated in the elastomeric compositions in an amount of from 1 to 50% weight, preferably from 1 to 15% by weight, calculated on the elastomer. However, if required, larger quantities can be used.

The expression "rubber" used herein refers to natural and synthetic rubber. Representative synthetic rubbery polymers include the butadiene polymers. Butadiene polymers include those polymers having rubber-like properties which are prepared by polymerizing butadiene alone or with one or more other polymerizable ethylenically unsaturated compounds, such as styrene, methylstyrene, methyl isopropenyl ketone and acrylonitrile. The butadiene being present in the mixture preferably to the extent of at least 40% of the total polymerizable material. Other synthetic rubbers include the neoprene rubbers. Isobutylene rubber (butyl) and ethylenepropylene rubber (EPDM) may also be employed.

The rubber employed will contain various additives such as those needed to effect the vulcanization. Examples of these materials include sulfur, carbon black, antioxidants, zinc oxide, accelerators, silica, processing and softening oils and the like. The components are preferably employed in an amount varying from about 0.1 part to 100 parts per 100 parts of rubber.

Methylene donors in the vulcanizable rubber compositions, according to the present invention, are capable of generating formaldehyde by heating during the vulcanization includes various compounds disclosed in the specification of U.S. Pat. No. 3,751,331. Suitable examples of these methylene donors are hexamethylenetetramine, di to hexamethylol melamines or completely or partially etherified or esterified derivatives thereof, oxazolidine derivatives or the like. The weight ratio of the methylene donor to resorcinolic novalak resins can range from 1:10 to 10:1.

A preferred method of making the rubber vulcanizate is to mix the rubber, carbon black, zinc oxide, lubricants and novalak resin in a Banbury mixer at a temperature of about 150° C. The resulting masterbatch is then compounded on a standard 2-roll rubber mill with sulfur accelerators and formaldehyde precursor. The vulcanization composition is then shaped and then cured.

The following examples are given for the purpose of illustrating this invention and not intended as limitations thereof.

EXAMPLE 1

The reaction kettle equipped with a stirrer, thermometer and reflux condenser was charged with 310.7 g (1.41 moles) of, nonylphenol, 104.8 g (55% W/W; 1.92 moles) of methyl FORMCEL 28.8 g (0.3 mole) of furfural and 4.0 g of sodium hydroxide (50% W/W) solution. The reaction was carried out at 80°-85° C. for 10 hours. After this, the reaction mixture was cooled to room temperature and 105 g of methanol was added followed by the slow addition of 148.7 g of resorcinol (1.35 moles). Again, the reaction mixture was refluxed for 5 hours and finally the solvent was removed under reduced pressure to give Resin A having a softening point of 110.5° C.

EXAMPLE 2

Nonylphenol (277.7 g, 1.26 moles), cashewnut shell liquid (Cardolite NC-511; 45.0 g; 0.15 moles), methyl FORMCEL (55% W/W; 114.7 g; 2.1 moles) and 2.8 g of sodium hydroxide (50% W/W) solution were charged into a reaction kettle and refluxed for 10 hours. At the end of the reflux, the reaction flask was cooled and 105.0 g of methanol was added. Then 148.7 g (1.35 moles) of resorcinol was added slowly and the solution refluxed again for 5 hours. Finally, the solvent was removed under reduced pressure to give Resin B having a softening point of 110.9° C.

EXAMPLE 3

Into a 500 ml reaction kettle were charged 110 g of resorcinol (1.0 mole) and 48.6 g of 37% aqueous formaldehyde (0.6 mole) solution and refluxed for 5.0 hours. After the reflux period, water was distilled out at 135° C. under reduced pressure to give Resin C having a softening point of 103° C.

EXAMPLE 4

Fuming of resorcinol and its resins at Banbury temperatures are associated with the volatile products obtained from either the unreacted resorcinol and its compounds or their decomposition products. One way to determine the volatility of a material is to run a thermogravimetric analysis. Table I shows the thermogravimetric analysis results of resorcinolic resins carried out in nitrogen atmosphere.

TABLE I

| | Thermogravimetric Analysis of Resins | | |
|---|---|---|---|
| | % Weight Loss at[1] | | |
| Resins | 125° C. | 150° C. | 175° C. |
| Resin A | 0 | 0.1 | 0.2 |
| Resin B | 0 | 0.2 | 0.8 |
| Resin C | 0.2 | 0.8 | 2.2 |

[1]Heating rate = 20° C./min. in nitrogen atmosphere.

From this table it is very clear that alkylphenol modified resorcinolic resins (Resin A and B) are low fuming resins compared to resorcinol-formaldehyde resin (Resin C).

EXAMPLE 5

The hygroscopicity of the alkylphenol modified resorcinolic resins (Resin A and B) and resorcinolformaldehyde resin (Resin C) was tested by spreading the pulverized resins (each about 14.0 grams) on a dish and allowing to stand in a constant moisture and temperature room at 22° C. under a relative humidity of 71%. The amount of moisture absorbed and the changes of the surface were observed for about one week. The results are shown in Table II.

TABLE II

| | Amount of Absorbed Moisture (%)[1] | | | |
|---|---|---|---|---|
| | State of appearance | | | |
| Resin | 1st Day | 3rd Day | 5th Day | 7th Day |
| Resin A | 0.76 | 1.14 | 1.36 | 1.45 |
| | (no change) | (no change) | (no change) | (no change) |
| Resin B | 0.75 | 1.21 | 1.47 | 1.57 |
| | (no change) | (no change) | (no change) | (no change) |
| Resin C | 2.57 | 5.14 | 6.24 | 6.65 |
| | (agglom.)* | (agglom.)* | (agglom.)* | (agglom.)* |

[1]Relative humidity of 71% and temperature of 22° C.
*(agglom.) = agglomerated

From this table it is clear that the alkylphenol modified resorcinolic resins (Resins A and B) are less hygroscopic compared to resorcinol-formaldehyde resin (Resin C).

EXAMPLE 6

The black natural rubber compounds were prepared in three stages to test the adhesion and reinforcing effects of resins A, B and C prepared in Examples 1 to 3 respectively. The basic compound formulation is shown in Table III using Masterbatch I.

TABLE III

| Rubber Compound Used In Reinforcing and Adhesion Tests, Resins A, B and C | |
|---|---|
| Masterbatch I | Parts by weight |
| Natural Rubber SMRL | 100.0 |
| HAF Black N-326 | 55.0 |
| Zinc Oxide | 8.0 |
| Stearic Acid | 1.2 |
| N-(1,3-Dimethylbutyl)-N'-Phenyl-p-Phenylenediamine | 2.0 |
| Polymerized 1,2-Dihydro-2,2,4-Trimethylquinoline | 1.0 |
| N-(Cyclohexylthio)Phthalimide | 0.2 |
| Resorcinolic Resin | 2.0 |
| Cobalt Naphthenate (12%) | 0.83 |
| Insoluble Sulfur (80%) | 4.69 |
| N-t-butyl-2-benzothiazolesulfenamide | 1.00 |
| Methylene Donor[1] | 3.08 |

[1]Hexamethoxymethylmelamine (65% HMMM)

Regarding Resins A, B and C, in the first stage, the black masterbatch (Masterbatch I) was mixed in a Size 3 Banbury mixer to a dump temperature of 143° C. and sheeted to a thickness of 10 mm. In the second stage, an appropriate amount of the black masterbatch (Masterbatch I) for each compound was mixed with the required level of resorcinolic resin and cobalt compound on a two-roll lab mill at 118°-124° C. The compounds were sheeted and cooled. The sulfur, accelerator and appropriate amount of HMMM were added to the compound in the third stage, using the two-roll mill at 96°-102° C. The compounds were aged overnight in a constant temperature room at 23° C. and 50% relative humidity before testing.

Cure characteristics for each compound were determined with a Monsanto 100 Rheometer at 149° C.; 1° arc and 1.67 Hz according to ASTM D2084-81 method.

The rheometer cure data, adhesion data, tensile test data and dynamic mechanical analysis results obtained on the cured rubber samples for Resins A, B and C using Masterbatch I are given in Table IV.

TABLE IV

| Rubber Compound Properties (Using Masterbatch I) | | | |
|---|---|---|---|
| Property/Test | Resin A | Resin B | Resin C |
| Rheometer cure (ASTM D-2084) | | | |
| MH (lbs.) | 52.0 | 53.3 | 54.2 |
| ML (lbs.) | 8.8 | 9.0 | 9.2 |
| ts 2 (scorch time) (min.) | 4.4 | 4.0 | 3.9 |
| t' 90 (cure time) (min.) | 13.3 | 14.5 | 12.3 |
| Tensile (ASTM D-412) | | | |
| 300% Modulus (psi) | 2883 | 2965 | 3008 |
| Tensile Strength (psi) | 3384 | 3717 | 3679 |
| Ultimate Elongation (%) | 356 | 387 | 379 |
| Adhesion (ASTM D-2229) | | | |
| BW-49 Wire (Low copper 63.5% copper, 4.9 g./Kg plating) | | | |
| Unaged (lbs.) | 290(85) | 290(85) | 350(100) |
| (% Rubber coverage) | | | |
| Steam 8 hours at 120° C. | 344(100) | 335(100) | 352(100) |
| (lbs.) (% Rubber coverage) | | | |
| Dynamic Mechanical[1,2] | | | |
| Unaged | | | |
| G' at 0.2% Strain, MPa | 12.45 | 11.59 | 10.54 |
| G" at 2.0% Strain, MPa | 15.26 | 13.80 | 12.83 |

[1]Cured to t' 90 at 150° C.
[2]Rheometrics Mechanical Spectrometer 800, 0.1 Hz, RT.

It is clear from the dynamic mechanical test results set forth in Table IV that improved mechanical properties are observed for compounds using Resins A or B over compounds using Resin C. This improvement in mechanical properties is associated with the presence of unsaturation in the resorcinolic novolak type resins of the present invention.

To determine the effect of unsaturation on the improved properties of the cured rubber compounds over cured rubber compounds using the conventional resorcinolic formaldehyde resin (Resin C) or the resin prepared according to U.S. Pat. No. 4,257,926, cured rubber compounds were prepared using one of the following resins: the allylphenol modified resorcinol-formaldehyde resin of this invention (Resin D); resorcinol-formaldehyde resin (Resin C); and nonylphenol modified resin (Resin E). These cured rubber compounds were then tested. The following examples illustrate the improvement of alkylphenol resorcinol modified resins by inclusion of unsaturation in the alkyl chain of the resin system (Resin D).

EXAMPLE 7

Into a 1-liter reaction kettle equipped with a stirrer, thermometer and reflux condenser, 157.7 g (1.175 moles) of allylphenol, 88.6 g (55% W/W; 1.625 moles of methyl FORMCEL and 3.0 g of sodium hydroxide (50% W/W) solution. The reaction was carried out at 80°–90° C. for 7 hours. After this, the reaction mixture was cooled to room temperature and 60.0 g of methanol was added followed by the slow addition of 123.9 g of resorcinol (1.125 moles). Again, the reaction mixture was refluxed for 3 more hours, and finally the solvent was removed under reduced pressure to give Resin D having a softening point of 73° C.

EXAMPLE 8

Into a 2-liter reaction kettle equipped with a stirrer, thermometer and reflux condenser, 440.7 g (2.0 moles) of nonylphenol, 150.8 g (55% W/W; 2.77 moles) of methyl FORMCEL and 5.0 g of sodium hydroxide (50% W/W) solution. The reaction was carried out at 80°–90° C. for 7 hours. After this, the reaction mixture was cooled to room temperature and 100.0 g of methanol was added followed by the slow addition of 210.5 g (1.914 moles) of resorcinol. Again the reaction mixture was refluxed for 3.0 more hours, and finally the solvent was removed under reduced pressure to give Resin E having a softening point of 93° C.

EXAMPLE 9

The black natural rubber compounds used to test the effect of the presence of unsaturated hydrocarbon in the resins were prepared according to the procedure described in Example 6. For this test, the basic compound formulation used (Masterbatch II) is shown in Table V.

The differences between Masterbatch I and Masterbatch II are the parts by weight of resorcinolic resins, methylene donor and N-t-butyl-2-benzothiazolesulfenamide.

TABLE V

Rubber Compound Used in Reinforcing and Adhesion Tests, Resins C, D and E

| Masterbatch II | Parts by weight |
|---|---|
| Natural Rubber SMRCV60 | 100.0 |
| HAF Black N-326 | 55.0 |
| Zinc oxide | 8.0 |
| Stearic acid | 1.2 |
| N-(1,3-Dimethylbutyl)-N-Phenyl-p-Phenylendiamine | 2.0 |
| Polymerized 1,2-Dihydro-2,2,4-Trimethylquinoline | 1.0 |
| N-(Cyclohexylthio) Phthalimide | 0.2 |
| Resorcinolic Resins | 3.5 |
| Cobalt Naphthenate (12%) | 0.83 |
| Insoluble Sulfur (80%) | 4.69 |
| N-t-Butyl-2-benzothiozolesulfenamide | 0.60 |
| Methylene Donor[1] | 2.5 |

[1]Hexamethoxymethylmelamine (65% HMMM)

The rheometer cure data, adhesion data, tensile test data and dynamic mechanical analysis results obtained on the cured rubber samples for Resins C, D and E using Masterbatch II are given in Table VI.

TABLE VI

Rubber Compound Properties (Using Masterbatch II)

| Property/Test | Resin C | Resin D | Resin E |
|---|---|---|---|
| Rheometer cure (ASTM D-2084) | | | |
| MH, in-lb. | 50.2 | 61.9 | 50.5 |
| ML, in-lb | 6.1 | 5.7 | 5.4 |
| ts 2, minutes | 3.2 | 3.6 | 3.4 |
| t$^1$ 90, minutes | 14.3 | 15.4 | 16.7 |
| Tensile (ASTM D-412) | | | |
| Unaged: | | | |
| 200% Modulus (psi) | 1331 | 1501 | 1428 |
| Tensile Strength (psi) | 3265 | 3513 | 3415 |
| Ultimate Elongation (%) | 417 | 417 | 423 |
| Adhesion (ASTM D-2229) | | | |
| 7 × 4 × 0.175 mm wire: 63.5% copper, 4.9 g/Kg plating | | | |
| Unaged (lbs.) (% rubber coverage) | 267(90) | 262(90) | 257(90) |
| Shore A hardness | 71 | 80 | 75 |
| Steam 16 hours at 120° C. (lbs.) (% rubber coverage) | 287(90) | 278(90) | 289(90) |
| Shore A hardness | 70 | 80 | 75 |
| Dynamic Mechanical[1,2] | | | |
| G' at 0.2% Strain, MPa | 28.62 | 39.84 | 26.35 |
| G" at 2.0% Strain, MPa | 34.34 | 45.62 | 30.84 |
| Shore A hardness | 80 | 87 | 83 |

[1]cured to t' 90 at 150° C.
[2]Rheometrics Mechanical Spectrometer 800, 0.1 Hz, RT.

the improved rheometer cure (MH), tensile strength, hardness and dynamic mechanical (G') properties of Resin D over Resin C and Resin E are associated with the presence of unsaturated hydrocarbon molecule in Resin D.

This data clearly demonstrates that the resins of this invention improve the mechanical properties of the cured rubber compound while maintaining comparable adhesion properties of the resorcinol-formaldehyde resin.

It will be appreciated that the resins described according to this invention are low fuming and less hygroscopic rubber compounding resins. Although the invention has been described with some particularity, it is to be understood that the present invention has been made only as an example and that the scope of the invention is defined by what is hereafter claimed.

What is claimed is:

1. A vulcanizable rubber composition comprising:
   (I) a rubber component selected from at least one member of the group consisting of natural rubber, styrene butadiene copolymer rubber, polyisoprene rubber, polybutadiene rubber, acrylonitrile butadiene rubber and polychloroprene rubber;
   (II) a methylene donor compound which is capable of generating formaldehyde by heating; and
   (III) a methylene acceptor prepared by condensing (A) a resol prepared by first reacting at least one monovalent phenol having the general formula (A)

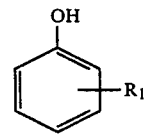

(a)

wherein $R_1$ may be selected from the group consisting of hydrogen, an allyl, an alkyl having 1 to about 20 carbon atoms and an aryl having about 6 to about 12 carbon atoms, with a solution of formaldehyde in methanol and furfural in the presence of an alkaline catalyst; and then (B) reacting the product of Step (A) with at least one of the compounds having the general formula (b)

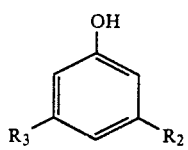

wherein $R_2$ and $R_3$ may be the same or different radicals selected from the group consisting of —H, —OH, —NH$_2$, an allyl and an alkyl having 1 to about 20 carbon atoms.

2. The composition of claim 1 wherein the methylene donor is selected from the group consisting of hexamethoxymethyl-melamine and hexamethylenetetramine.

3. The composition of claim 1 wherein the concentration of methylene donor is from 1 to about 15 parts per hundred parts of the rubber.

4. The composition of claim 1 wherein the concentration of methylene acceptor is from 1 to about 15 parts per hundred parts of the rubber.

5. The composition of claim 1 wherein after Step A an organic solvent is added before reacting the product of Step A with Step B.

6. A vulcanizable rubber composition comprising:
(I) a rubber component selected from at least one member of the group consisting of natural rubber, styrene butadiene copolymer rubber, polyisoprene rubber, polybutadiene rubber, acrylonitrile butadiene rubber and polychloroprene rubber;
(II) a methylene donor compound which is capable of generating formaldehyde by heating; and
(III) a methylene acceptor prepared by condensing
(A) a resol prepared by first reacting at least one monovalent phenol having the general formula (a)

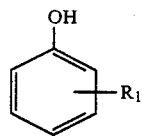

wherein $R_1$ may be selected from the group consisting of hydrogen, an allyl, and alkyl having 1 to about 20 carbon atoms and an aryl having about 6 to about 12 carbon atoms, and cashew nut shell liquid having both meta-substituted alkylphenol (90%) wherein the alkyl group consists of 15 carbon atoms with at least two carbon-carbon double bonds in the chain and meta-substituted alkyl resorcinol (10%) wherein the alkyl group consists of 15 carbon atoms with at least two carbon-carbon double bonds in the chain, with a solution of formaldehyde in methanol and/or furfural in the presence of an alkaline catalyst; and the (B) reacting the product of Step (A) with at lest one of the compounds having the general formula (b)

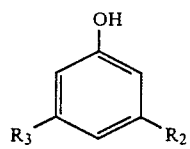

wherein $R_2$ and $R_3$ may be the same or different radicals selected from the group consisting of —H, —OH, —NH$_2$, an allyl and an alkyl having 1 to about 20 carbon atoms.

7. The composition of claim 6 wherein the methylene donor is selected from the group consisting of hexamethoxymethyl-melamine and hexamethylenetetramine.

8. The composition of claim 6 wherein the concentration of methylene donor is from 1 to about 15 parts per hundred parts of the rubber.

9. The composition of claim 6 wherein the concentration of methylene acceptor is from 1 to about 15 parts per hundred parts of the rubber.

10. The composition of claim 6 wherein after Step A an organic solvent is added before reacting the product of Step A with Step B.

11. A vulcanizable rubber composition comprising:
(I) a rubber component selected from at least one member of the group consisting of natural rubber, styrene butadiene copolymer rubber, polyisoprene rubber, polybutadiene rubber, acrylonitrile butadiene rubber and polychloroprene rubber;
(II) a methylene donor compound which is capable of generating formaldehyde by heating; and
(III) a methylene acceptor prepared by condensing a
(A) a resol prepared by first reacting at least one monovalent phenol having the general formula (a)

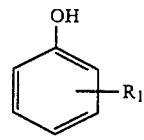

wherein $R_1$ is an allyl, with a solution of formaldehyde in methanol and/or furfural in the presence of an alkaline catalyst; and then (B) reacting the product of Step (A) with at least one of the compounds having the general formula (b)

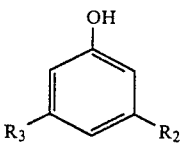

wherein $R_2$ and $R_3$ may be the same or different radicals selected from the group consisting of —H, —OH, —NH$_2$, an allyl and an alkyl having 1 to about 20 carbon atoms.

12. The composition of claim 11 wherein the methylene donor is selected from the group consisting of hexamethoxymethyl-melamine and hexamethylenetetramine.

13. The composition of claim 11 wherein the concentration of methylene donor is from 1 to about 15 parts per hundred parts of the rubber.

14. The composition of claim 11 wherein the concentration of methylene acceptor is from 1 to about 15 parts per hundred parts of the rubber.

15. The composition of claim 11 wherein after Step A an organic solvent is added before reacting the product of Step A with Step B.

* * * * *

UNITED STATES PATENT AND TRADEMARK OFFICE
CERTIFICATE OF CORRECTION

PATENT NO. : 5,030,692
DATED      : July 9, 1991
INVENTOR(S) : BOJAYAN DURAIRAJ

It is certified that error appears in the above-identified patent and that said Letters Patent is hereby corrected as shown below:

Column 1, line 54, "Lave" should be --have--.

Column 2, line 52, "a" should be --aryl--.

Column 3, line 17, "tow" should be --two--.

Column 3, line 18, "metal" should be --meta--.

Column 4, line 46, "'to 20" should be --1 to 20--.

Column 5, line 1, --groups-- should be inserted after "isododecyl".

Column 5, line 26, "5020" should be --50°--.

Column 11, line 66, "the" should be --then--.

Column 11, line 67, "lest" should be --least--.

Signed and Sealed this

Fifth Day of July, 1994

Attest:

BRUCE LEHMAN

Attesting Officer

Commissioner of Patents and Trademarks